United States Patent
Miyauchi et al.

(10) Patent No.: US 7,869,166 B2
(45) Date of Patent: Jan. 11, 2011

(54) THIN FILM MAGNETIC HEAD HAVING A BIAS MAGNETIC LAYER PROVIDED WITH ANTIFERROMAGNETIC LAYER AND A PINNED LAYER PROVIDED WITH HARD MAGNETIC LAYER

(75) Inventors: Daisuke Miyauchi, Tokyo (JP); Shinji Hara, Tokyo (JP); Takahiko Machita, Tokyo (JP)

(73) Assignee: TDK Corporation, Tokyo (JP)

( * ) Notice: Subject to any disclaimer, the term of this patent is extended or adjusted under 35 U.S.C. 154(b) by 996 days.

(21) Appl. No.: 11/676,961

(22) Filed: Feb. 20, 2007

(65) Prior Publication Data

US 2008/0198515 A1 Aug. 21, 2008

(51) Int. Cl.
G11B 5/39 (2006.01)

(52) U.S. Cl. .............................. 360/324.11; 360/324.12

(58) Field of Classification Search ............... 360/324.1, 360/324.11, 324.12, 324.2
See application file for complete search history.

(56) References Cited

U.S. PATENT DOCUMENTS

| | | | |
|---|---|---|---|
| 7,652,856 B2 * | 1/2010 | Pinarbasi | 360/324.11 |
| 2004/0207960 A1 * | 10/2004 | Saito et al. | 360/324.1 |
| 2004/0207962 A1 * | 10/2004 | Saito et al. | 360/324.11 |
| 2007/0076331 A1 * | 4/2007 | Pinarbasi | 360/324.11 |
| 2007/0127167 A1 * | 6/2007 | Freitag et al. | 360/324.11 |
| 2007/0146939 A1 * | 6/2007 | Pinarbasi | 360/324.11 |
| 2009/0021870 A1 * | 1/2009 | Pinarbasi | 360/324.11 |

FOREIGN PATENT DOCUMENTS

| | | |
|---|---|---|
| JP | 09-091624 | 4/1997 |
| JP | 01-320717 | 12/1998 |
| JP | 2002-171013 | 6/2002 |
| JP | 2005-044490 | 2/2005 |
| JP | 2006-179566 | 7/2006 |

* cited by examiner

*Primary Examiner*—Jefferson Evans
(74) *Attorney, Agent, or Firm*—Knobbe Martens Olson & Bear LLP

(57) ABSTRACT

A thin film magnetic head has: a spin valve having a pinned layer whose having a fixed magnetization direction, a first nonmagnetic intermediate layer disposed on the pinned layer, and a free layer having a variable magnetization direction, the free layer disposed on the first nonmagnetic intermediate layer; and bias magnetic layers for applying a bias magnetic field to the free layer provided on both sides of the spin valve. The pinned layer has a hard magnetic layer, a second nonmagnetic intermediate layer disposed on the hard magnetic layer, and a ferromagnetic layer disposed on the second nonmagnetic intermediate layer. The bias magnetic layer has a bias antiferromagnetic layer, and a bias ferromagnetic layer disposed on the bias antiferromagnetic layer. A height direction dimension of the pinned layer is longer than a track width direction dimension, and longer than a height direction dimension of the free layer.

16 Claims, 10 Drawing Sheets

THIN FILM MAGNETIC HEAD HAVING A BIAS MAGNETIC LAYER PROVIDED WITH ANTIFERROMAGNETIC LAYER AND A PINNED LAYER PROVIDED WITH HARD MAGNETIC LAYER

BACKGROUND OF THE INVENTION

1. Field of the Invention

The present invention relates to a thin film magnetic head, and more particularly relates to the construction of a pinned layer and a bias magnetic layer.

2. Description of the Related Art

A GMR (Giant Magneto Resistance) element is known as a reproducing element for a thin film magnetic head. Conventionally, a CIP (Current In Plane)-GMR element, in which sense current flows in a direction that is horizontal to film surfaces, has been mainly used. However, an element in which sense current flows in a direction that is perpendicular to the film surfaces has been developed in recent years in order to cope with higher density recording. A TMR (Tunnel Magneto-resistance) element which uses the TMR effect and a CPP (Current Perpendicular to the Plane) element which uses the GMR effect are known as elements of this type. In particular, the CPP element has high potential because it has a lower resistance as compared with the TMR element and because it exhibits a large output even for a narrow track width as compared with the CIP element.

The GMR element and the TMR element are provided with a spin valve (hereinafter referred to as SV) which includes a pinned layer whose magnetization direction is fixed relative to an external magnetic field, a free layer whose magnetization direction is changed according to the external magnetic field, and a first nonmagnetic intermediate layer that is sandwiched by the pinned layer and the free layer. The SV is formed in a column shape. The SV is sandwiched by a pair of shield layers which also serve as electrodes for supplying sense current.

It is necessary that the magnetization direction of the pinned layer is firmly fixed without being affected by an external magnetic field. For this reason, a so-called synthetic pinned layer is generally used. The synthetic pinned layer has an outer pinned layer, an inner pinned layer, and a second nonmagnetic intermediate layer that is made of Ru or Rh and that is sandwiched between the outer pinned layer and the inner pinned layer. The inner pinned layer is in contact with the first nonmagnetic intermediate layer and directly contributes to a change in magneto-resistance. The inner pinned layer is antiferromagnetically coupled with the outer pinned layer via the second nonmagnetic intermediate layer, so that the magnetization direction of the inner pinned layer is fixed. Further, since the magnetization direction of the inner pinned layer and that of the outer pinned layer are anti-parallel to each other, the magnetization of the pinned layer is limited as a whole. Accordingly, by using the element as a read element of the head, it is possible to avoid deviation of a bias point that may occur due to the static magnetic field from the pinned layer.

In the synthetic pinned layer, an antiferromagnetic layer that is in contact with the outer pinned layer is often provided in order to fix the magnetization direction of the outer pinned layer. The antiferromagnetic layer is typically made of IrMn. The antiferromagnetic layer fixes the magnetization direction of the outer pinned layer through exchange-coupling with the outer pinned layer. The magnetization direction of the antiferromagnetic layer, i.e., the direction of magnetization of sub-lattices of the antiferromagnetic layer is fixed by annealing. Specifically, the antiferromagnetic layer is magnetized in the direction in which the magnetic field is applied during annealing. In this specification, "annealing" refers to placing a magnetic layer in a magnetic field at a high temperature in order to fix the magnetization direction of the magnetic layer. Further, in this specification, "magnetizing treatment" refers to placing a magnetic layer in a magnetic field at room temperature in order to fix the magnetization direction of the magnetic layer. When the magnetization direction of the antiferromagnetic layer is fixed by annealing, the magnetization direction of the outer pinned layer is aligned with the magnetization direction of the antiferromagnetic layer, and the magnetization direction of the inner pinned layer is fixed in a direction that is anti-parallel to the magnetization direction of the outer pinned layer.

Magnetic layers are provided on both sides of the SV with regard to the track width direction via insulating films, which are made of oxide films, such as $Al_2O_3$. This magnetic layer is referred to as a bias magnetic layer, and applies bias magnetic field to the free layer in order to magnetize the free layer into a single magnetic domain. Magnetizing the free layer into a single magnetic domain is effective for improving the linearity of change in resistance that is caused by a change in the external magnetic field, and at the same time, for limiting Barkhausen noise. The bias magnetic layer is formed of a hard magnetic material, such as CoPt and CoCrPt. The magnetization direction of the bias magnetic layer is fixed in the track width direction through magnetizing treatment, which is performed after the antiferromagnetic layer is annealed. In this specification, "track width direction" refers to a direction that is parallel to the track width direction of a recording medium when a slider that includes the element is positioned opposite to the recording medium.

The antiferromagnetic layer has an important role of fixing the magnetization direction of the pinned layer. However, the antiferromagnetic layer does not contribute to a change in magneto-resistance, and additionally causes parasitic resistance. Further, the large thickness of antiferromagnetic layer increases the distance between the pair of shield layers. This is disadvantageous for realizing high recording density, particularly high linear recording density. There is a need to eliminate the antiferromagnetic layer in order to diminish the distance between the shields to achieve high linear recording density.

SUMMARY OF THE INVENTION

An object of the present invention is to provide a thin film magnetic head that is capable of eliminating the antiferromagnetic layer that fixes the magnetization direction of the pinned layer, and of diminishing the distance between the shields.

Another object of the present invention is to provide a method for manufacturing such a thin film magnetic head.

According to an embodiment of the present invention, a thin film magnetic head comprises: a spin valve having a pinned layer whose magnetization direction is fixed relative to an external magnetic field, a first nonmagnetic intermediate layer which is disposed on said pinned layer, and a free layer whose magnetization direction is changed according to the external magnetic field, said free layer being disposed on said first nonmagnetic intermediate layer; and bias magnetic layers for applying a bias magnetic field to said free layer, said bias magnetic layers being provided on both sides of said spin valve with regard to a track width direction thereof. The pinned layer comprises a hard magnetic layer, a second nonmagnetic intermediate layer which is disposed on said hard magnetic layer, and a ferromagnetic layer which is disposed on said second nonmagnetic intermediate layer. The bias magnetic layer comprises a bias antiferromagnetic layer, and a bias ferromagnetic layer which is disposed on said bias antiferromagnetic layer. The pinned layer is formed in a manner such that a height direction dimension thereof is longer than a track width direction dimension thereof, and is longer than a height direction dimension of said free layer.

In a conventional thin film magnetic head in which the synthetic pinned layer is provided for the pinned layer, the antiferromagnetic layer is provided adjacent to the pinned layer in order to obtain exchange-coupling with the outer pinned layer. According to the present invention, the outer pinned layer of the pinned layer is formed of a hard magnetic layer, while the bias magnetic layer is provided with a stacked structure of a bias antiferromagnetic layer and a bias ferromagnetic layer. In other words, a magnetic field detecting element of the present invention has a construction in which the structure in the vicinity of the outer pinned layer and the structure of the bias magnetic layer are exchanged with each other, in contrast to the conventional magnetic field detecting element. Since the magnetization direction of the hard magnetic layer can be fixed by the magnetizing treatment, the antiferromagnetic layer is not required for the purpose of fixing the magnetization direction. This makes it possible to diminish the distance between the shields. The magnetization direction of the bias magnetic layers can be fixed by annealing because the bias antiferromagnetic layers are provided. This means that the magnetization directions of the bias magnetic layers and the pinned layer can be fixed by separate procedures, similarly to prior art. However, the magnetization by the magnetizing treatment is less stable than the magnetization by annealing, and the magnetization direction that is fixed by the magnetizing treatment tends to be fluctuated under the influence of an external magnetic field. Therefore, the pinned layer is formed such that it has a longer dimension in the height direction than in the track width direction. The magnetization direction of the pinned layer is firmly fixed in the height direction due to the shape anisotropy effect. On the other hand, the dimension of the free layer in the height direction is smaller than the dimension of the pinned layer in the height direction. Accordingly, the shape anisotropy effect is not generated in the free layer.

The bias ferromagnetic layer is preferably formed such that a track width direction dimension thereof is longer than a height direction dimension thereof. This configuration makes it possible to apply a bias magnetic field more effectively to the free layer.

A ratio of said track width direction dimension of said bias ferromagnetic layer to said height direction dimension of said bias ferromagnetic layer is preferably 10 or more.

A ratio of said height direction dimension of said pinned layer to said track width direction dimension of said pinned layer is preferably 5 or more.

According to another embodiment of the present invention, a method for manufacturing a thin film magnetic head comprises: a step of forming a stacked structure of layers comprising a hard magnetic layer which is to be formed into a pinned layer whose magnetization direction is fixed relative to an external magnetic field, a first nonmagnetic intermediate layer, and a ferromagnetic layer which is to be formed into a free layer whose magnetization direction is changed according to the external magnetic field, wherein said hard magnetic layer, said first nonmagnetic intermediate layer, and said ferromagnetic layer are stacked in this order; a first milling step of milling said stacked structure into a first rectangular shape; a step of sequentially stacking bias antiferromagnetic layers and bias ferromagnetic layers on both sides of said stacked structure with regard to a longitudinal axis of said first rectangular shape, said stacked structure having been milled; a second milling step of milling each bias ferromagnetic layer and said stacked structure which was milled, wherein said second milling step is performed in a manner such that said bias ferromagnetic layer is formed into a second rectangular shape, a longitudinal axis of said second rectangular shape corresponding to an short axis of said first rectangular shape, and such that said ferromagnetic layer is removed except for a portion that is sandwiched between said second rectangular shapes, and such that said hard magnetic layer survives. Further the method for manufacturing a thin film magnetic head comprises: an annealing step of annealing said bias antiferromagnetic layer in order to fix a magnetization direction of said bias antiferromagnetic layer in a direction of said longitudinal axis of said second rectangular shape; and a step of magnetizing said hard magnetic layer in order to fix a magnetization direction of said hard magnetic layer in a direction of a longitudinal axis of said first rectangular shape, wherein said step of magnetizing said hard magnetic layer is performed after said annealing step.

The above and other objects, features and advantages of the present invention will become apparent from the following description with reference to the accompanying drawings which illustrate examples of the present invention.

DETAILED DESCRIPTION OF THE PREFERRED EMBODIMENTS

Figure 1:
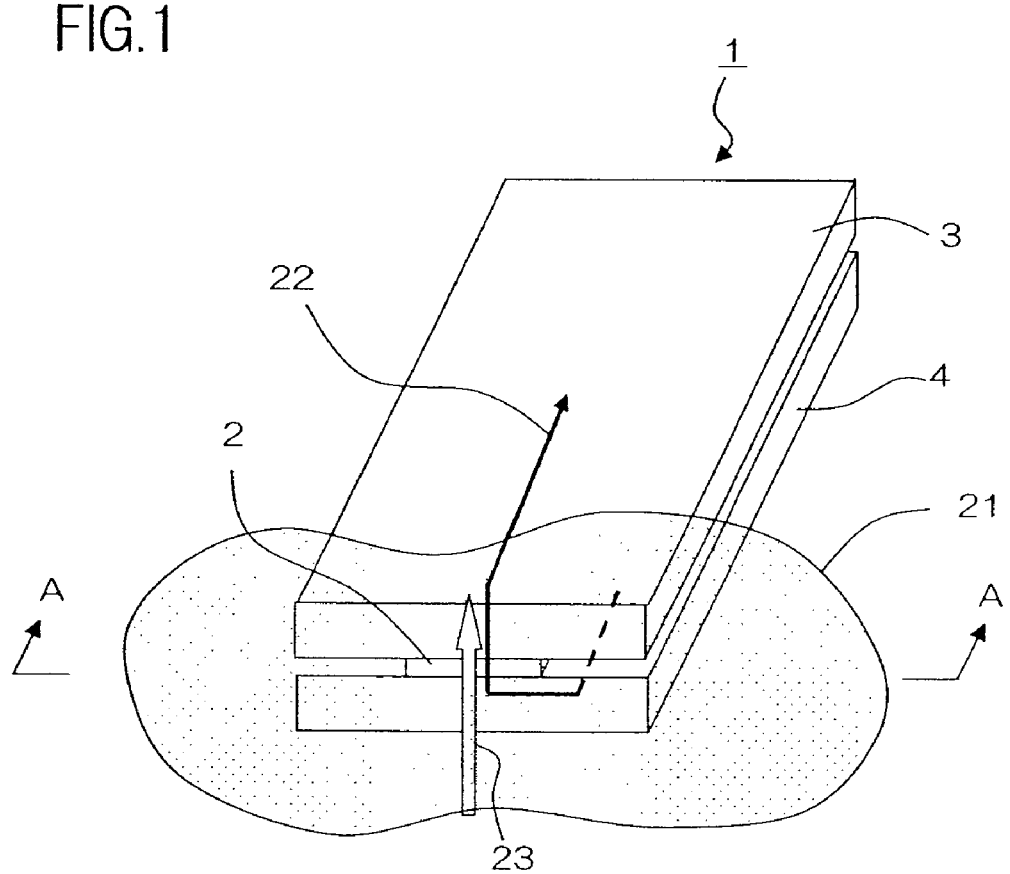
FIG. 1 is a partial perspective view of a thin film magnetic head.

In the following, an embodiment according to the present invention will be described with reference to the accompanying drawings. FIG. 1 is a partial perspective view of a thin film magnetic head. Thin film magnetic head 1 may be a read-only head or may be an MR/inductive composite head which further includes a write head portion. Thin film magnetic head 1 has SV 2 that constitutes a part of the CPP element. SV 2 is sandwiched between upper electrode/shield 3 and lower electrode/shield 4, and the tip portion thereof is disposed opposite to recording medium 21. SV 2 is configured such that sense current 22 flows in the direction that is perpendicular to film surfaces under a voltage that is applied between upper electrode/shield 3 and lower electrode/shield 4. The magnetic field of recording medium 21 at the position opposite to SV 2 is changed with the movement of recording medium 21 in moving direction 23. SV 2 detects a change in the magnetic field as a change in electric resistance based on the magneto-resistance effect, and thereby thin film magnetic head 1 reads magnetic information that is written in each magnetic domain of recording medium 21.

Figure 2A:
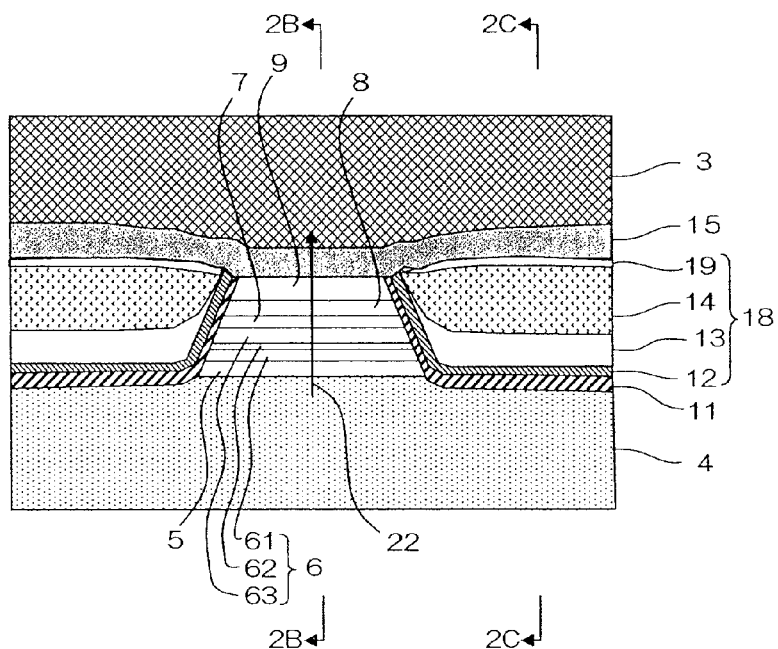
FIG. 2A is a side view of the thin film magnetic head as viewed from the 2A-2A direction in FIG. 1.
Figure 2B:
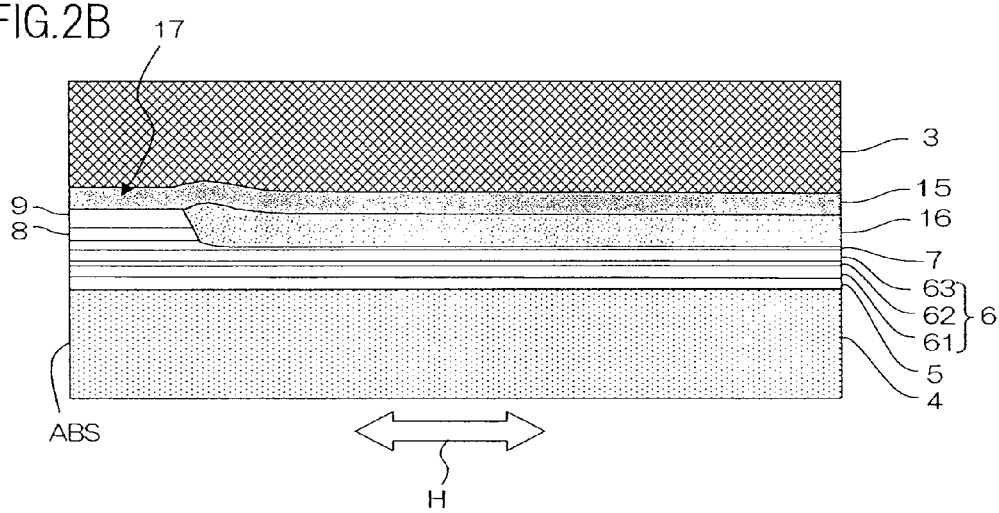
FIG. 2B is a sectional view taken along line 2B-2B in FIG. 2A.

FIG. 2A is a side view of the thin film magnetic head as viewed from the 2A-2A direction in FIG. 1, i.e., from the air bearing surface. FIG. 2B is a sectional view taken along line 2B-2B in FIG. 2A. The air bearing surface is a surface of thin film magnetic head 1 which faces recording medium 21. An exemplary layer structure of SV 2, as well as a layer structure of bias magnetic layer 18 which will be described later, is shown in Table 1. In Table 1, layers are shown in the order of stacking, that is, from buffer layer 5 on the side of lower electrode/shield 4, which is at the bottom row of the table, to cap layer 9 on the side of upper electrode/shield 3, which is at the top row of the table. The same applies to the layer structure of bias magnetic layer 18. The numerals in the composition column in the table represent the atomic percent of each element.

TABLE 1

| Layer Structure | | Composition | Thickness(nm) |
|---|---|---|---|
| SV Film 2 | | | |
| Cap Layer 9 | | Ta | 7 |
| | | Ru | 3 |
| Free Layer 8 | | Co70Fe30 | 1 |
| | | Ni81Fe19 | 2 |
| | | Co70Fe30 | 0.5 |
| | | Cu | 0.2 |
| | | Co70Fe30 | 0.5 |
| | | Ni81Fe19 | 2 |
| | | Co70Fe30 | 1 |
| First Nonmagnetic Intermediate Layer 7 | | Cu | 3 |
| Pinned Layer 6 | Inner Pinned Layer 63 | Co50Fe50 | 1 |
| | | Cu | 0.2 |
| | | Co50Fe50 | 1 |
| | | Cu | 0.2 |
| | | Co90Fe10 | 1 |
| | Nonmagnetic intermediate Layer 62 | Ru | 0.8 |
| | Outer Pinned Layer 61 | CoPt | 5 |
| Buffer Layer 5 | | NiCr | 3 |
| | | Ta | 1 |
| Bias Magnetic Layer 18 | | | |
| Cap Layer 19 | | Ta | 2 |
| Bias Hard Magnetic Layer 14 | | Ni | 15 |
| | | CoFe | 3 |
| Bias Antiferromagnetic | | IrMn | 7 |
| Seed Layer 12 | | NiCr | 3 |

SV 2 is a stacked structure of layers that is formed by stacking buffer layer 5, pinned layer 6, first nonmagnetic intermediate layer 7, free layer 8, and cap layer 9 in this order on lower electrode/shield 4 that is made of a NiFe layer and has a thickness of approximately 1 μm. Buffer layer 5 is provided as a seed layer for pinned layer 6. Pinned layer 6 is a layer whose magnetization direction is fixed relative to an external magnetic field. Free layer 8 is a layer whose magnetization direction is changed according to the external magnetic field. Sense current 22 is configured to flow in a direction that is perpendicular to the film surfaces of SV 2. The magnetization direction of free layer 8 forms a relative angle with the magnetization direction of pinned layer 6 depending on the external magnetic field. Spin-dependent scattering of conduction electrons is changed in accordance with the relative angle, and a change in magneto-resistance is caused. Thin film magnetic head 1 reads magnetic information on the recording medium by detecting the change in magneto-resistance.

Pinned layer 6 is constructed as a so-called synthetic pinned layer. Specifically, pinned layer 6 consists of outer pinned layer 61, inner pinned layer 63, which is provided closer to first nonmagnetic intermediate layer 7 than outer pinned layer 61, and second nonmagnetic intermediate layer 62, which is sandwiched between outer pinned layer 61 and inner pinned layer 63. As shown in FIG. 2B, the region above pinned layer 6 is filled with insulating layer 16 that is made of $Al_2O_3$ except for the region under free layer 8.

Outer pinned layer 61 is a hard magnetic layer that is made of CoPt, CoCrPt, or CoCrTa. The magnetization direction of outer pinned layer 61 is fixed in the magnetizing process which will be described later. Specifically, outer pinned layer 61 is a self pinned type layer whose magnetization direction is fixed by the nature of the hard magnetic layer itself, rather than a conventional type layer whose magnetization direction is fixed by exchange coupling with the antiferromagnetic layer. Therefore, it is possible to eliminate the antiferromagnetic layer, and pinned layer 6 is formed on buffer layer 5 in contact with buffer layer 5. The layer thickness of SV 2 is reduced because the antiferromagnetic layer is not required. In the CPP element, a large change in resistance can be obtained by using a thick magnetic film because bulk scattering largely contributes to the magneto-resistance effect. Although the thickness of individual magnetic layers tends to be increased for this reason, it is possible to easily cope with high linear recording density by eliminating the antiferromagnetic layer. Further, the MR ratio can be increased because the antiferromagnetic layer, which does not contribute to the magneto-resistance effect, is not required, and thus the parasitic resistance of SV 2 is reduced. This effect is not negligible in the case of a CPP element because a CPP element has small resistance. The layer thickness of outer pinned layer 61 is determined such that the magnetic moments of inner pinned layer 63 and outer pinned layer 61 are substantially equal to each other. Therefore, the layer thickness of outer pinned layer 61 is not increased even if a hard magnetic layer made of, for example, CoPt is used.

Inner pinned layer 63 has a multilayer structure in which a Cu layer is inserted between CoFe layers. The Cu layer is inserted in order to enhance the magneto-resistance effect. Inner pinned layer 63 may have a multilayer structure of CoFe/Cu/CoFe or CoFe/Cu/CoFe/(Cu/CoFe)x (where x is a natural number). The notation of A1/A2/ . . . An represents that layers A1 to An are stacked in this order. Inner pinned layer 63 is antiferromagnetically coupled with outer pinned layer 61 via second nonmagnetic intermediate layer 62 that is made of Ru etc., and thereby, the magnetization direction of inner pinned layer 63 is firmly fixed. In the synthetic pinned layer, a stable magnetization state of pinned layer 6 can be maintained in this way while effective magnetization of pinned layer 6 is limited as a whole.

Free layer 8 has a layer structure in which NiFe layers, which are soft magnetic layers, and Cu layers, which are non-magnetic layers, are alternately stacked. Insertion of the Cu layers increases the number of boundaries, and therefore, improves the magneto-resistance effect. Further, by providing CoFe layers on both boundaries of the Cu layer, spin polarization is increased at the boundaries of the Cu layer, leading to an improved magneto-resistance effect, as compared with a layer structure in which a Cu layer and a NiFe layer are stacked in contact with each other. Free layer 8 may also have a simpler layer structure, such as CoFe/NiFe.

Cap layer 9 is provided to prevent deterioration of each of the stacked layers. Upper shield layer 3 is formed over cap layer 9 via shield seed layer 15.

Figure 3:
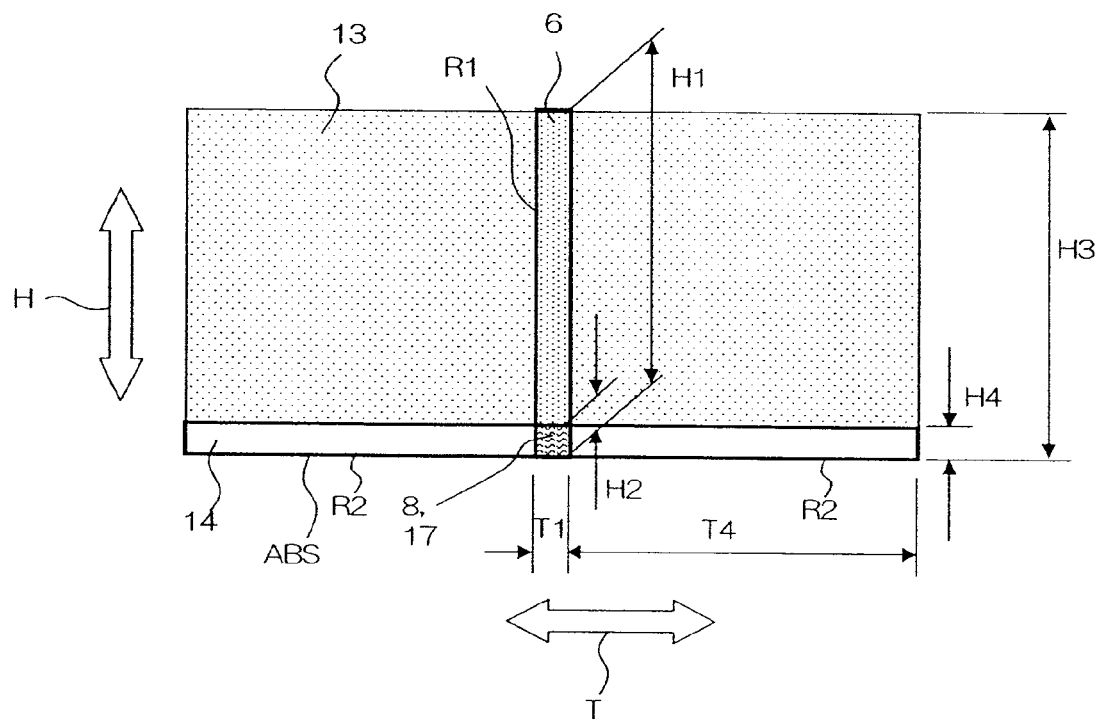
FIG. 3 is a plan view of the read head portion of the thin film magnetic head.

FIG. 3 is a plan view of the read head portion of the thin film magnetic head. FIG. 3 shows the portion below shield seed layer 15. Insulating layer 16 (see FIG. 2B), cap layers 9, 19 (see FIG. 2A), and first non-magnetic layer 7 are not shown. Outer pinned layer 61 is magnetized in one direction of height direction H (see FIG. 3), and consequently, inner pinned layer 63 is magnetized in the other direction of height direction H. Pinned layer 6 is formed such that height direction dimension H1 is longer than track width direction dimension T1. Height direction dimension H1 is a dimension in the direction that is perpendicular to air bearing surface ABS, as shown in FIG. 3. The ratio of height direction dimension H1 to track width direction dimension T1 is preferably 5 or more. Since height direction dimension H1 is longer than track width direction dimension T1, an axis of easy magnetization for pinned layer 6 is formed in height direction H. This effect is referred to as the shape anisotropy effect. In general, as compared with a magnetic body whose magnetization direction is fixed by annealing, the magnetization direction of a magnetic body whose magnetization direction is fixed by magnetizing treatment tends to be more easily affected when it is subjected to a large magnetic field. This may lead to difficulty in maintaining the magnetization direction under certain use conditions. However, the shape anisotropy effect that occurs due to the shape of pinned layer 6, or the shape which is elongated in height direction H, makes the magnetization direction firmly fixed.

Free layer 8 is formed such that height direction dimension H2 is smaller than height direction dimension H1 of pinned layer 6. Free layer 8 preferably has no shape anisotropy in order to allow the magnetization direction to be accurately changed in accordance with an external magnetic field. Therefore, free layer 8 has a substantially square cross section. The portion of SV 2 that is pulled out by the cross section of free layer 8 is called junction 17. Free layer 8 corresponds to junction 17 in FIG. 3.

First nonmagnetic intermediate layer 7 preferably has a cross section that is similar to the cross section of free layer 8. However, no practical problem occurs even if first nonmagnetic intermediate layer 7 has an elongated shape, similarly to pinned layer 6. As will be described later, free layer 8 is formed into a square shape by means of milling, while pinned layer 6 is formed into a rectangular shape without being milled. Accordingly, in order to provide pinned layer 6 with the shape anisotropy effect, milling of pinned layer 6 must be avoided. In order to ensure that the milling of pinned layer 6 is avoided taking into account the imperfect accuracy of milling, it is preferable that milling is stopped at an intermediate position in first nonmagnetic intermediate layer 7. Therefore, nonmagnetic intermediate layer 7 extends in height direction H, similarly to pinned layer 6, but has a smaller layer thickness than junction 17 in regions other than junction 17, as shown in FIG. 2B.

Figure 2C:
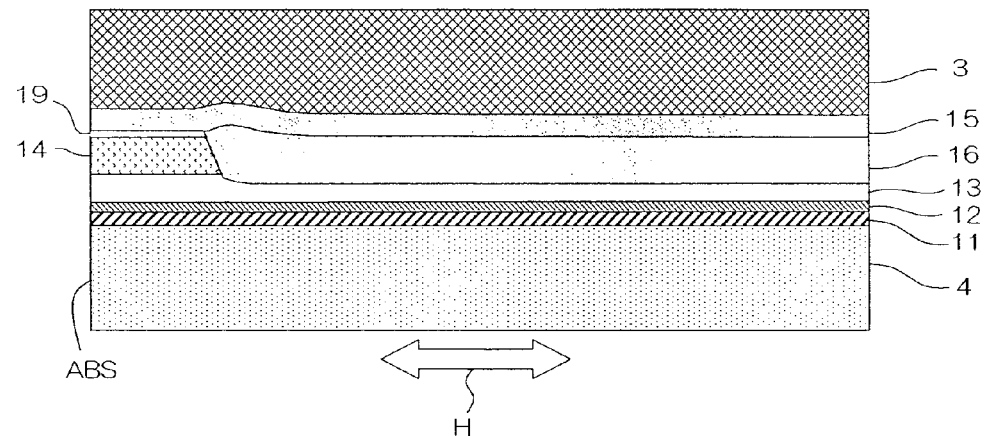
FIG. 2C is a sectional view taken along line 2C-2C in FIG. 2A.

FIG. 2C is a sectional view taken along line 2C-2C in FIG. 2A. Referring to FIGS. 2A, 2C, bias antiferromagnetic layers 13 are formed on both sides of SV 2 with regard to track width direction T via insulating films 11 and seed layers 12. Bias magnetic layers 14 are formed on bias antiferromagnetic layers 13. Bias magnetic layer 14 is covered by cap layer 19.

Seed layer 12, bias antiferromagnetic layer 13, bias magnetic layer 14, and cap layer 19 constitute bias magnetic layer 18.

Insulating films 11 are provided to ensure that sense current bypasses bias magnetic layer 18. Insulating film 11 is formed of $Al_2O_3$ or the like.

Seed layer 12 is provided to improve the exchange coupling between bias antiferromagnetic layer 13 and bias magnetic layer 14. Seed layer 12 is formed of NiCr or the like.

The magnetization direction of bias magnetic layer 14 is fixed in track width direction T by bias antiferromagnetic layer 13 due to exchange coupling with bias magnetic layer 14. Accordingly, bias magnetic layer 14 applies a bias magnetic field to free layer 8 in track width direction T, and magnetizes free layer 8 into a single magnetic domain. Bias antiferromagnetic layer 13 is made of IrMn. Bias antiferromagnetic layer 13 has height direction dimension H3 that is equal to height direction dimension H1 of pinned layer 6. Bias antiferromagnetic layer 13 is slightly milled, and therefore, the region except for the region under bias ferromagnetic layer 14 has a slightly smaller layer thickness than the region under bias ferromagnetic layer 14. Insulating layer 16, which is made of $Al_2O_3$, is filled on bias antiferromagnetic layer 13 except for the region under bias ferromagnetic layer 14.

Bias magnetic layer 14 is a stacked structure of layers that are made of a CoFe layer and a Ni layer. Bias ferromagnetic layer 14 has track width direction dimension T4 that is longer than height direction dimension H4. The ratio of track width direction dimension T4 to height direction dimension H4 of bias ferromagnetic layer 14 is preferably 10 or more. An axis of easy magnetization is formed in bias ferromagnetic layer 14 in track width direction T for the same reason as in the case of pinned layer 6. As a result, the magnetization direction of bias ferromagnetic layer 14 is firmly fixed in track width direction T. The reason why bias ferromagnetic layer 14 is disposed on bias antiferromagnetic layer 13 will be described later.

The ideal configuration for bias magnetic layer 18 is that bias ferromagnetic layer 14 be formed into a rectangular shape by means of milling and that bias antiferromagnetic layer 13 is not milled so that sufficient volume of the bias antiferromagnetic layer is ensured. Such a configuration allows the enhanced shape anisotropy effect of bias ferromagnetic layer 14 and excellent exchange coupling. In order to achieve such a configuration, it is desirable that bias ferromagnetic layer 14 is milled to the bottom surface when the milling is stopped at an elevation slightly above pinned layer 6 by taking into consideration the milling rate of each layer that constitutes SV 2 and bias magnetic layer 18. The layer structure in Table 1 generally satisfies this condition.

Cap layer 19 is provided to prevent deterioration of each of the stacked layers, similarly to cap layer 9 of SV 2. Upper electrode/shield 3 mentioned above is formed over cap layer 19 and insulating layer 16.

A method for manufacturing the above mentioned thin film magnetic head will be explained with reference to FIGS. 4A to 4I and a flow chart shown in FIG. 5.

Figure 4A:
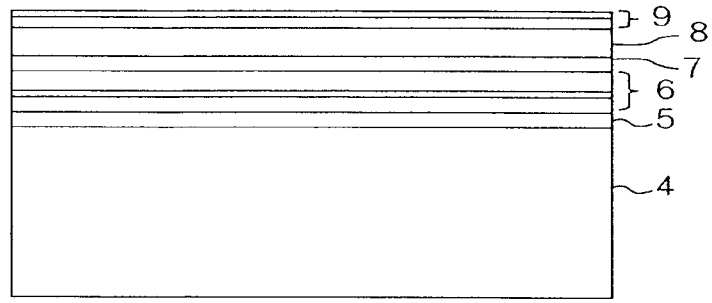
FIGS. 4A to 4I are step diagrams illustrating the method for manufacturing the thin film magnetic head shown in FIG. 1.
Figure 5:
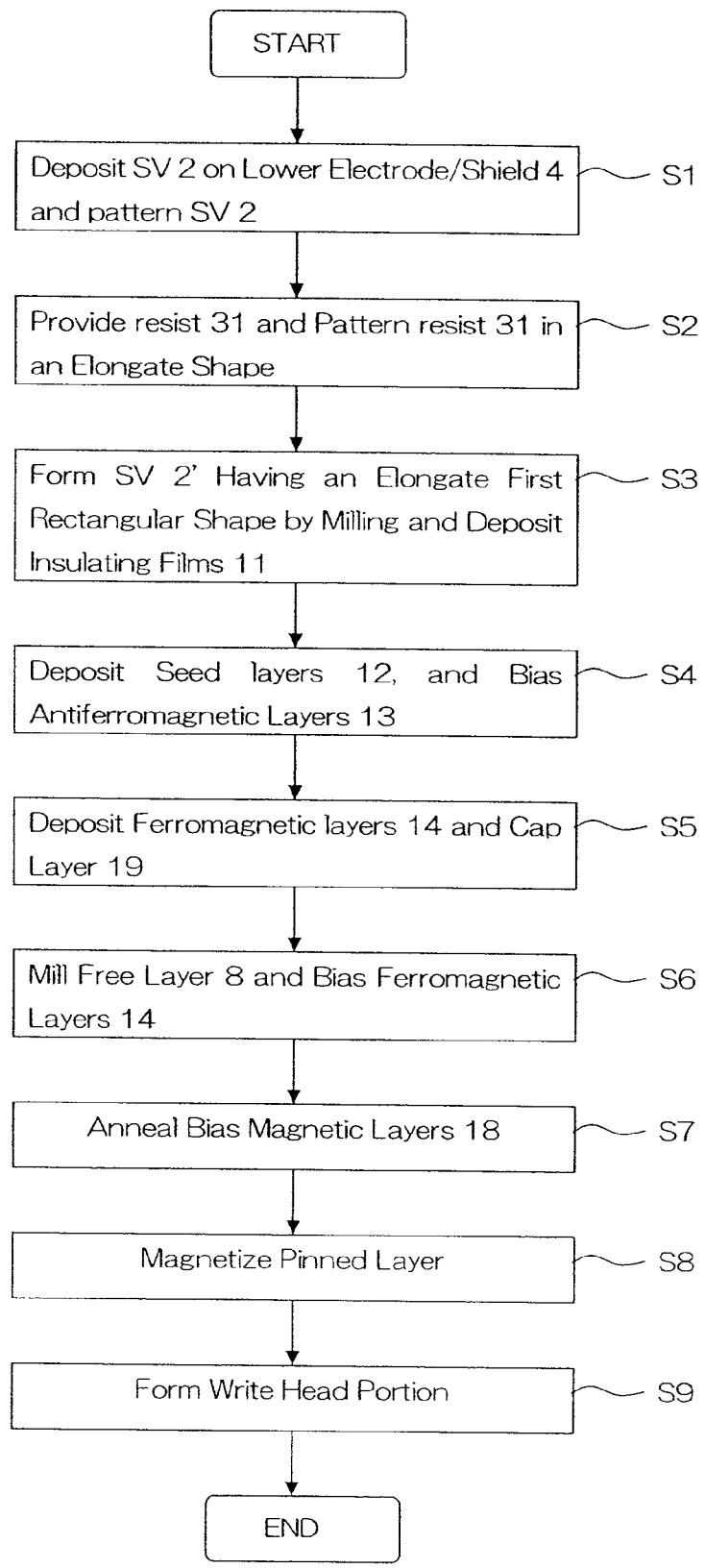
FIG. 5 is a flow chart showing the method for manufacturing the thin film magnetic head shown in FIG. 1.
Figure 6:
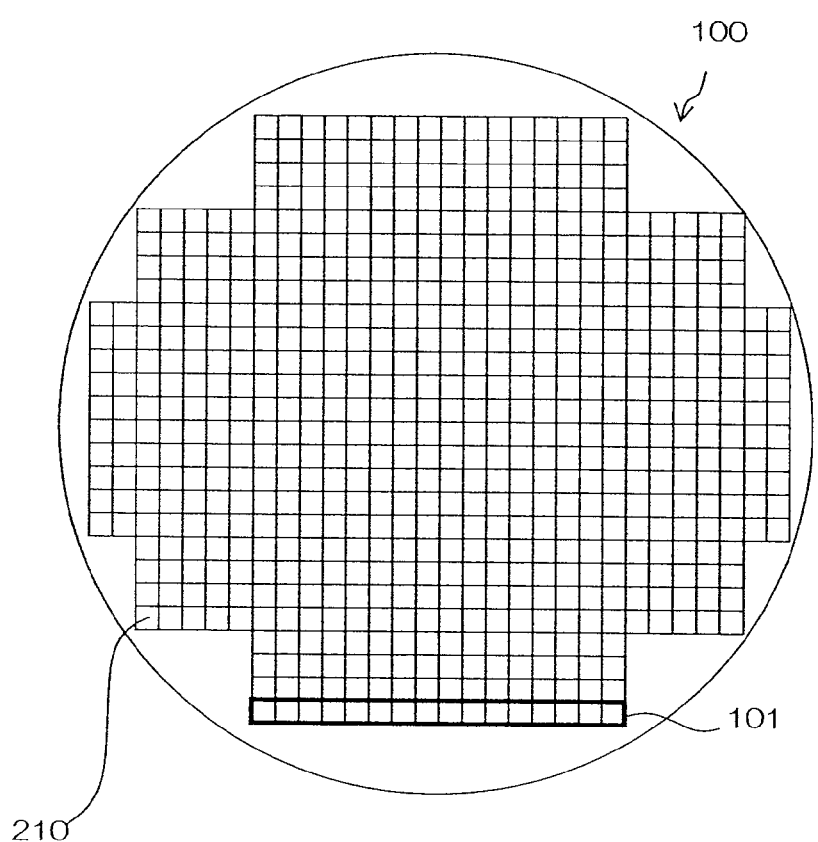
FIG. 6 is a plan view of a wafer which is used to manufacture the thin film magnetic head of the present invention.
Figure 7:
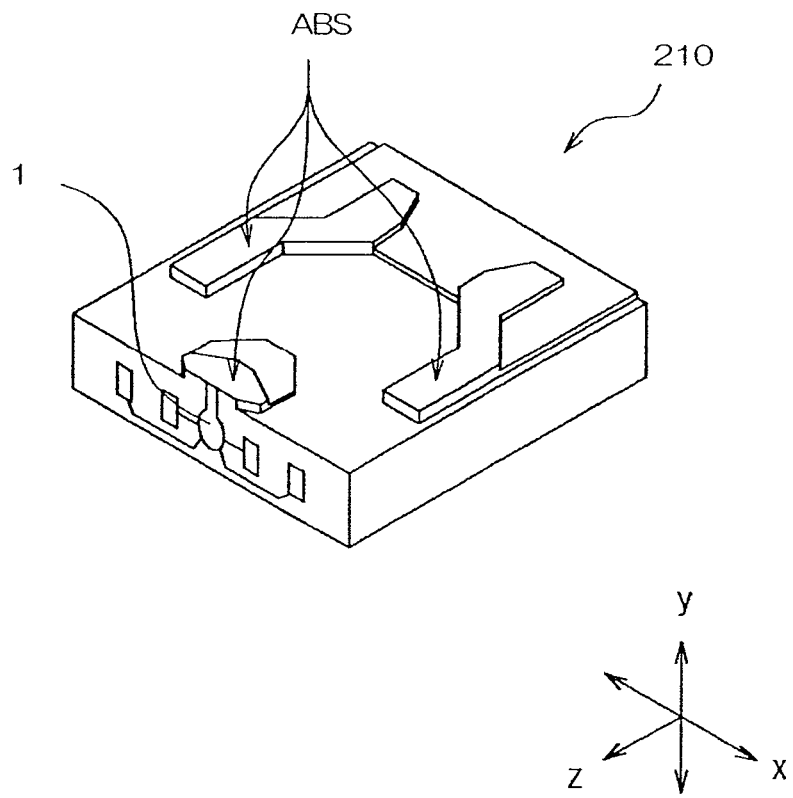
FIG. 7 is a perspective view of a slider of the present invention.

(Step S1) First, as shown in FIG. 4A, lower electrode/shield 4 is formed on a wafer that is made of a ceramic material, such as AlTiC ($Al_2O_3$.TiC), not shown, via an insulating layer, not shown. Then, the layers starting with buffer layer 5 and ending with cap layer 9 are sequentially formed by means of sputtering. Subsequently, the stacked layers are patterned into height direction dimension H1 of pinned layer 6 and track width direction dimension T4 of bias ferromagnetic layer 14.

Figure 4B:
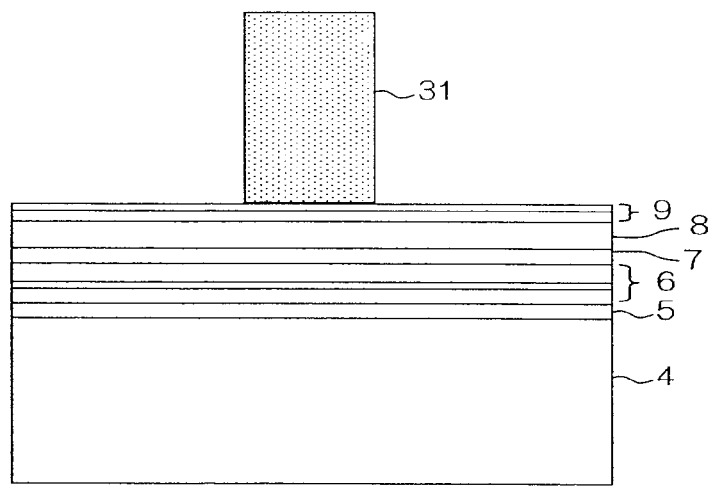

(Step S2) Next, as shown in FIG. 4B, resist 31 is provided and patterned. After patterning, resist 31 has first rectangular shape R1 shown in FIG. 3, i.e., the rectangular shape that covers pinned layer 6.

Figure 4C:
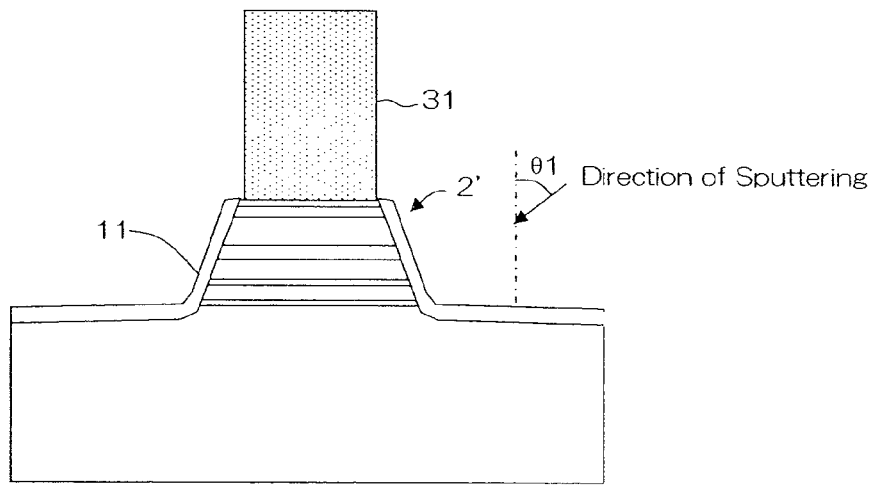

(Step S3: first milling step) Next, as shown in FIG. 4C, SV 2' that has elongated first rectangular shape R1 is formed by means of milling that uses resist 31 as a mask. The ratio of height direction dimension H1 of SV 2' to track width direction dimension T1 is preferably 5 or more. Then, insulating films 11 are formed on the side walls of elongated SV 2'. For example, ion beam sputtering may be used to form the films. Angle θ1 that is formed by the sputtering direction and the vertical axis of the wafer surface is preferably relatively large in order to ensure that insulating films 11 are formed on the side walls.

Figure 4D:
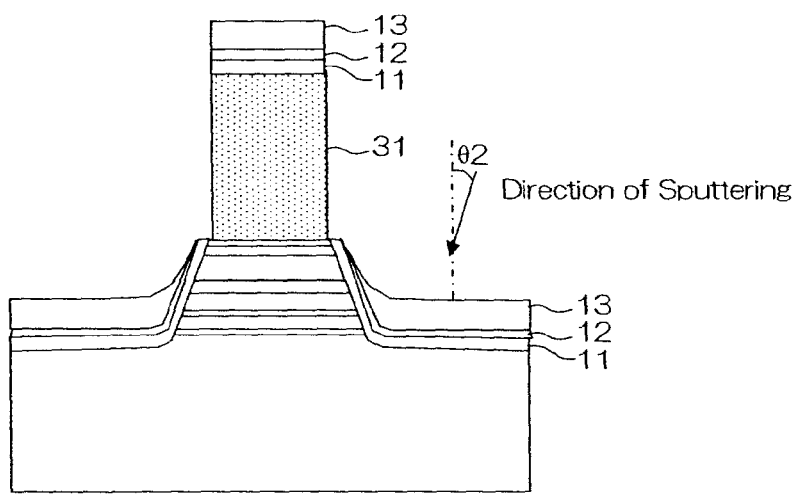
Figure 4E:
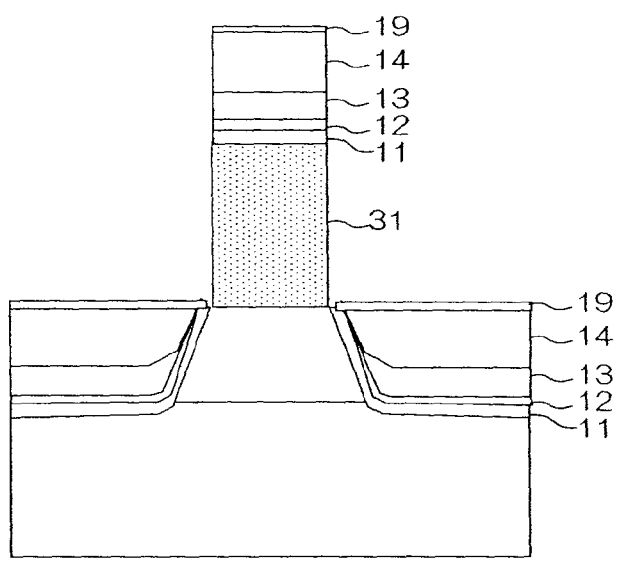

(Step S4) Next, as shown in FIGS. 4D, 4E, seed layers 12, bias antiferromagnetic layers 13, ferromagnetic layers 14, and cap layer 19, which constitute bias magnetic layers 18, are formed on insulating films 11. In order to apply a bias magnetic field more effectively, it is desirable to form bias antiferromagnetic layers 13, which are deposited on the side walls of SV 2', as thin as possible so that the distance between bias ferromagnetic layer 14 and free layer 8 is reduced. For this reason, deposition angle θ2 for bias antiferromagnetic layers 13 is preferably as small as possible. If deposition angle θ2 is small, then bias antiferromagnetic layer 13 is less likely to be deposited on the side walls, and the distance between free layer 8 and bias ferromagnetic layer 14 is reduced.

Figure 4F:
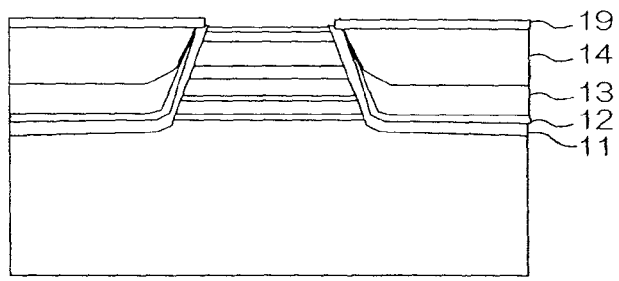

(Step S5) Next, resist 31 is removed, as shown in FIG. 4F. By removing resist 31, bias magnetic layers 18, which include bias antiferromagnetic layers 13 and ferromagnetic layers 14, are formed on both sides of the longitudinal axis of SV 2' that has first rectangular shape R1.

Figure 4G:
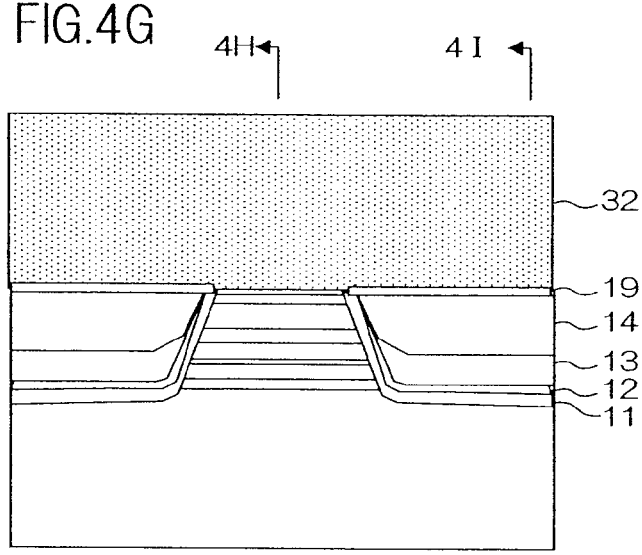
Figure 4H:
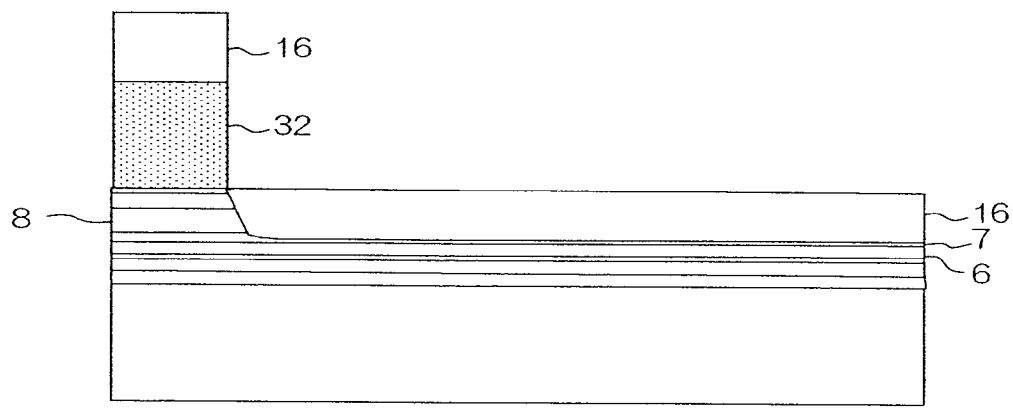
Figure 4I:
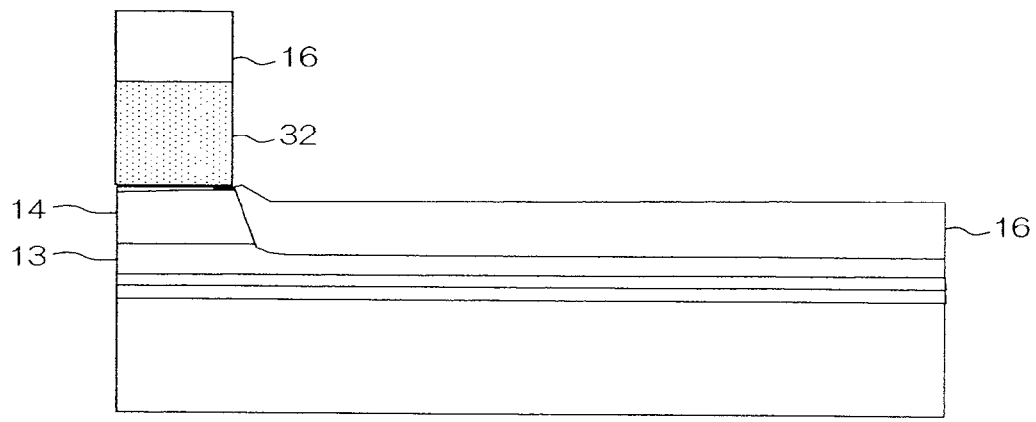

(Step S6: second milling step) Subsequently, milling is performed to form height direction dimension H2 of free layer 8 and height direction dimension H4 of bias ferromagnetic layer 14. First, as shown in FIG. 4G, resist 32 is provided and then patterned. After patterning, resist 32 has a shape that covers a pair of finished bias ferromagnetic layers 14 and junction 17 (free layer 8). Specifically, resist 32 has a shape that corresponds to a pair of second rectangular shapes R2 which are connected by junction 17 that is interposed therebetween. FIGS. 4H, 4I are sectional views taken along line 4H-4H and line 4I-4I in FIG. 4G, respectively. Next, as shown in these figures, free layer 8 is milled in a manner such that pinned layer 6 survives by using resist 32 as a mask. Height direction dimension H2 of free layer 8 is thus formed. Bias ferromagnetic layer 14 is milled simultaneously so that height direction dimension H4 is formed. As a result, bias ferromagnetic layer 14 is formed into second rectangular shape R2 having a longitudinal axis that is in the same direction as the short axis of first rectangular shape R1. Free layer 8 is removed except for the region that is sandwiched between the pair of bias ferromagnetic layers 14 having second rectangular shape R2. As described above, the ratio of track width direction dimension T4 of bias ferromagnetic layer 14 to height direction dimension H4 is preferably 10 or more. Bias ferromagnetic layer 14 is completely milled in the thickness direction, while bias antiferromagnetic layer 13 is slightly milled near the upper surface. Subsequently, insulating film 16 is formed and resist 32 removed, as shown in FIGS. 4H and 4I, and the configuration shown in FIGS. 2A to 2C is completed.

(Step S7) Next, bias magnetic layer 18 is annealed. The annealing of bias magnetic layer 18 is performed, for example, after the milling to form the shape of bias ferromagnetic layer 14. However, the annealing may be performed at any timing after bias ferromagnetic layer 14 is formed. The magnetization direction of bias antiferromagnetic layer 13 is fixed in track width direction T, i.e., in the direction of the longitudinal axis of second rectangular shape R2, by performing annealing in a magnetic field in track width direction T. The annealing is performed, for example, at a temperature of 250° C. and in a magnetic field of 637 kA/m (8 kOe).

(Step S8) Next, pinned layer 6 is subjected to magnetizing treatment. The magnetizing treatment is performed in the direction of the longitudinal axis of first rectangular shape R1. Pinned layer 6 is thus magnetized in height direction H. Because the annealing is performed first and the magnetizing treatment is performed next, the magnetization direction of bias antiferromagnetic layer 13, whose magnetization direction has been fixed by the annealing, is not affected. If the magnetizing treatment is performed first and the annealing is performed next, then the magnetization direction of pinned layer 6, whose magnetization direction has been fixed by the magnetizing treatment, will be undesirably rotated by the annealing. The magnetizing treatment is performed at room temperature in a magnetic field of, for example, about 785 kA/m (10 kOe).

(Step S9) When a write head portion is provided, a write magnetic pole layer and a coil are further stacked. After that, the entire portion is covered with a protective film. The wafer is diced, lapped, and then separated into stacked structures (sliders) in which the thin film magnetic head is formed.

In the present embodiment, bias magnetic layer 18 is constructed in a manner such that bias antiferromagnetic layer 13 is formed first and bias ferromagnetic layer 14 is formed next. There are two reasons for this configuration.

The first reason is to form bias ferromagnetic layer 14 in an elongated shape and to provide it with the shape anisotropy. Specifically, when free layer 8 is subjected to milling, bias ferromagnetic layer 14 is milled simultaneously. However, since it is necessary that the milling be stopped before pinned layer 6 is subjected to milling, the milling of bias ferromagnetic layer 14 is also stopped at that time. If bias ferromagnetic layer 14 is formed on bias antiferromagnetic layer 13 after antiferromagnetic layer 13 is formed, then bias ferromagnetic layer 14 is subjected to milling first and is formed in an elongated shape. On the other hand, if the positional relationship between bias ferromagnetic layer 14 and bias antiferromagnetic layer 13 is reversed, then bias antiferromagnetic layer 13 is subjected to milling first and bias ferromagnetic layer 14 is not formed in an elongated shape. Further, if bias antiferromagnetic layer 13 is milled first, then the volume of bias antiferromagnetic layer 13 is reduced while the volume of bias ferromagnetic layer 14 is relatively increased, which will make the exchange coupling unstable.

The second reason is to position bias ferromagnetic layer 14 at the side of free layer 8. In the present embodiment, since it is necessary to form pinned layer 6 in an elongated shape, the bottom spin type, in which free layer 8 is disposed above pinned layer 6, is essential because of the requirements of the manufacturing process. Accordingly, the structure in which bias ferromagnetic layer 14, that is used to apply the bias magnetic field, is disposed on bias antiferromagnetic layer 13, makes it easier to position bias ferromagnetic layer 14 at the side of free layer 8. Further, if bias ferromagnetic layer 14 is positioned at the side of pinned layer 6, then an unwanted magnetic field is continuously applied to pinned layer 6. This is not desirable. For these reasons, bias magnetic layer 18 is configured such that bias ferromagnetic layer 14 is disposed on bias antiferromagnetic layer 13.

Next, various test results which were performed to verify the effect of the present invention will be explained.

(Experiment 1)

The influence of the construction of the outer pinned layer and the shape of the pinned layer on the MR ratio was studied. Two cases of the construction of the outer pinned layer, i.e., a case in which a hard magnetic layer (CoPt layer) was used and a case in which a conventional CoFe layer was combined with an antiferromagnetic layer that is made of IrMn, were studied. The layer structure shown in Table 1 was used. The size of the junction was 0.1 μm×0.1 μm, and two cases of the shape of the pinned layer, i.e., rectangular and square, were studied. The length of each bias ferromagnetic layer was 5 μm. In other words, the aspect ratio of the bias ferromagnetic layer was 50. Elements of four kinds shown in Table 2 were fabricated, and the MR ratio was compared. In order to evaluate the influence of the difference in the shape of the pinned layer on the coercive force of the pinned layer in the cases in which the hard magnetic layer (CoPt) was used for the outer pinned layer, the coercive force of the pinned layer was estimated by comparing the portion of the MR curve that corresponds to the magnetic reversal of the pinned layer.

TABLE 2

| Sample No. | Outer Pinned Layer | Configuration of Pinned Layer | MR Ratio | Coercive Force of Pinned Layer |
|---|---|---|---|---|
| 1 | CoPt | Rectangular | 4.40% | 117 kA/m (1.5 kOe) |
| 2 | CoFe(+IrMn) | Rectangular | 3.80% | — |
| 3 | CoPt | Square | 3.50% | 64 kA/m (0.8 kOe) |
| 4 | CoFe(+IrMn) | Square | 3.00% | — |

Sample 1, which is the construction according to the present embodiment, exhibits the largest MR ratio. The inventors think that the first reason is that the antiferromagnetic layer was not provided in Sample 1, and therefore, parasitic resistance was reduced. The inventors think that the second reason is that the coercive force of the pinned layer was increased due to the rectangular shape of the pinned layer, and therefore, the magnetization direction of the pinned layer was more firmly fixed.

(Experiment 2)

Next, the shape of the bias ferromagnetic layer was studied using the layer structure of Sample 1 in Experiment 1. Specifically, the layer thickness of the cap layer that is made of Ta was changed in order to change the range in which the bias ferromagnetic layer was milled in the second milling step. In Table 3, when the layer thickness of the cap layer is 2 nm (Sample 1), the bias ferromagnetic layer was completely milled in the layer thickness direction, and the entire bias ferromagnetic layer was formed in an elongated shape. When the layer thickness of the cap layer is 15 nm (Sample 3), the bias ferromagnetic layer was not milled at all, and the bias ferromagnetic layer remained in a shape that is similar to a square. When the layer thickness of the cap layer is 7 nm (Sample 2), the upper half portion of the bias ferromagnetic layer alone was formed in an elongated shape. Further, the case in which CoCrPt, which is a hard magnetic material, was used for the bias magnetic layer and in which the entire bias magnetic layer was formed in an elongated shape (Sample 4) was also studied. In Samples 1 to 3, the magnetization direction of the bias antiferromagnetic layer was fixed by annealing at a temperature of 270° C. in a magnetic field of about 159 kA/m (2 kOe), and then the pinned layer was magnetized in a magnetic field of about 785 k/m (10 kOe). In Sample 4, the pinned layer was magnetized in a magnetic field of about 785 kA/m (10 kOe), and then the bias magnetic layer was magnetized in a magnetic field of about 159 kA/m (2 kOe). In order to evaluate the influence of the shape of the bias ferromagnetic layer on the magnetic characteristics, the standard deviation (1$\sigma$) of asymmetry was compared. The asymmetry represents the linearity (symmetry) of the r-H curve.

TABLE 3

| Sample No. | Thickness of Cap Layer | Bias Hard Magnetic Layer | Layer Structure of Bias Magnetic Layer | Asymmetry (%) |
|---|---|---|---|---|
| 1 | 2 nm | Elongate | NiCr/IrMn/CoFe/Ni/Ta | 12 |
| 2 | 7 nm | Elongate in Upper Portion | NiCr/IrMn/CoFe/Ni/Ta | 16 |
| 3 | 15 nm | Not Milled | NiCr/IrMn/CoFe/Ni/Ta | 19 |
| 4 | 2 nm | Elongate | CrTi/CoCrPt | 21 |

In Sample 4, the standard deviation of the asymmetry was found to be very large. The inventors think that this is because the bias antiferromagnetic layer was not magnetized or because the magnetization direction of the pinned layer was rotated when the bias antiferromagnetic layer was subjected to the magnetizing treatment.

By comparing Samples 1 to 3, it is found that the standard deviation of asymmetry was largely reduced when the cap layer is thin, i.e., when the bias ferromagnetic layer was milled into an elongated shape with regard to the track width direction. From the foregoing, it was confirmed that the bias ferromagnetic layer had shape anisotropy in the track width direction, and bias magnetic field was sufficiently applied.

(Experiment 3)

Next, the influence of the shape of the pinned layer on the magnetic characteristics, particularly on the coercive force of the pinned layer was studied. The same layer structure as in Sample 1 in Experiment 1 was used. The junction size was 0.1 μm×0.1 μm. The track width direction dimension of the pinned layer was 0.1 μm, and the height direction dimension was chosen from the range between 0.1 and 1.0 μm. In other word, the ratio (aspect ratio) of the height direction dimension of the pinned layer to the track width direction dimension was changed in the range of 1 to 10 for evaluation of the coercive force of the pinned layer. From Table 4, it was found that the magnetic characteristic (coercive force) was sufficiently improved when the aspect ratio was 5 or more.

TABLE 4

| Sample No. | Aspect Ratio of Pinned Layer | Coercive Force |
|---|---|---|
| 1 | 10 | 119 kA/m(1.5 kOe) |
| 2 | 5 | 115 kA/m(1.45 kOe) |
| 3 | 3 | 88 kA/m(1.1 kOe) |
| 4 | 1 | 64 kA/m(0.8 kOe) |

(Experiment 4)

Next, the influence of the shape of the bias ferromagnetic layer on the asymmetry variation was studied. The same layer structure as in Sample 1 in Experiment 1 was used. The junction size was 0.1 μm×0.1 μm. The height direction dimension of the bias ferromagnetic layer was equal to the junction size, which was 0.1 μm. The ratio (aspect ratio) of the track width direction dimension of the bias ferromagnetic layer to the height direction dimension was changed in the range of 3 to 50 for evaluation of asymmetry variation. From Table 5, it was found that the asymmetry variation is sufficiently limited when the aspect ratio was 10 or more.

TABLE 5

| Sample No. | Aspect Ratio of Bias Hard Magnetic | Asymmetry (%) |
| --- | --- | --- |
| 1 | 50 | 12 |
| 2 | 20 | 12 |
| 3 | 10 | 12 |
| 4 | 5 | 15 |
| 5 | 3 | 18 |

(Experiment 5)

Finally, the influence of the deposition angle θ2 of the bias antiferromagnetic layer on asymmetry variation was studied. As shown in Table 6, it was found that the asymmetry variation was decreased more and the bias magnetic field was more effectively applied in accordance with the decrease in deposition angle θ2. The inventors think that this is because the bias antiferromagnetic layer is formed on the side walls of the SV in a small thickness when it is formed at an angle that is close to a direction that is perpendicular to the wafer, and the distance between the bias ferromagnetic layer and the free layer is decreased, and therefore, the bias magnetic field is more effectively applied.

TABLE 6

| Sample No. | Deposition Angle for Bias Antiferromagnetic Layer 2 | Asymmetry (%) |
| --- | --- | --- |
| 1 | 12 | 12 |
| 2 | 25 | 13.5 |
| 3 | 40 | 15 |

Figure 8:
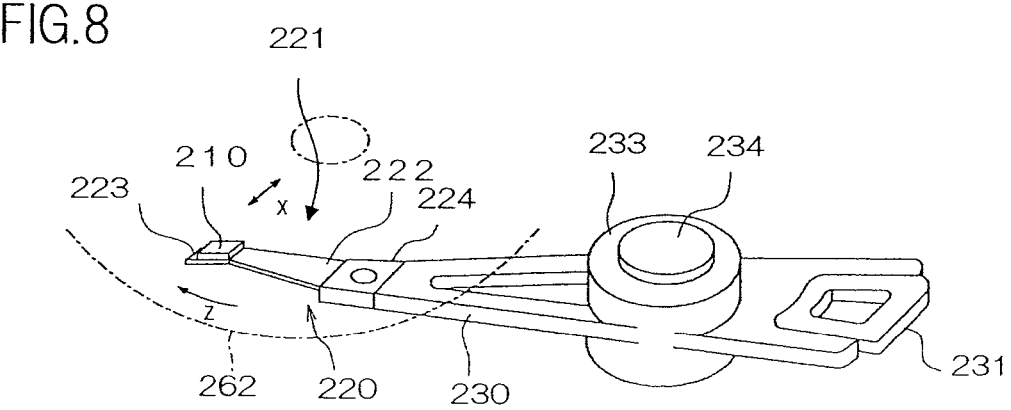
FIG. 8 is a perspective view of a head arm assembly which includes a head gimbal assembly which incorporates a slider of the present invention.

Next, explanation will be made regarding a wafer for fabricating a thin-film magnetic head described above. FIG. 8 is a schematic plan view of a wafer. Wafer 100 has layers which are deposited thereon to form at least the thin-film magnetic head. Wafer 100 is diced into bars 101 which serve as working units in the process of forming air bearing surface ABS. After lapping, bar 101 is diced into sliders 210 which include thin-film magnetic heads 1. Dicing portions, not shown, are provided in wafer 100 in order to dice wafer 100 into bars 101 and into sliders 210.

Figure 9:
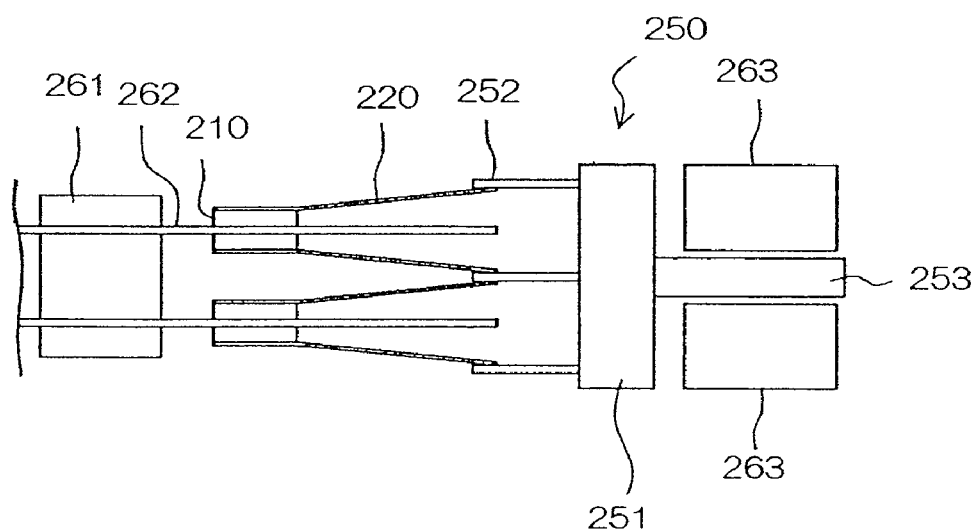
FIG. 9 is a side view of a head arm assembly which incorporates sliders of the present invention.

Referring to FIG. 9, slider 210 has a substantially hexahedral shape. One of the six surfaces of slider 210 forms air bearing surface ABS, which is positioned opposite to the hard disk.

Figure 10:
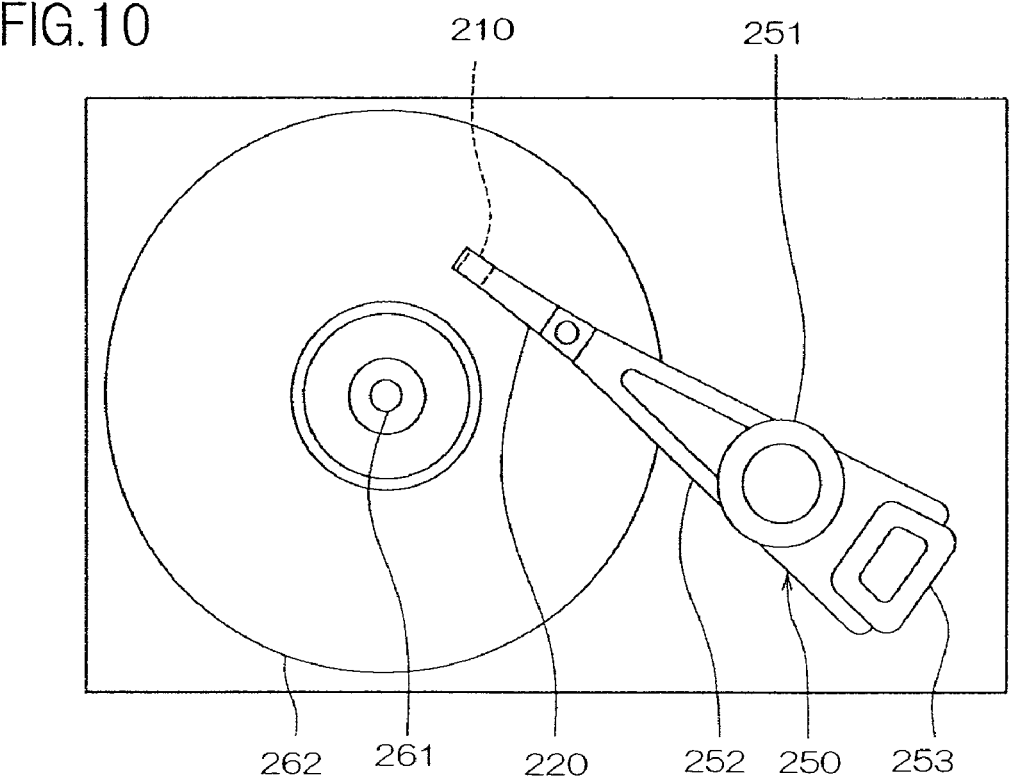
FIG. 10 is a plan view of a hard disk drive which incorporates sliders of the present invention.

Referring to FIG. 10, head gimbal assembly 220 has slider 210 and suspension 221 for resiliently supporting slider 210. Suspension 221 has load beam 222 in the shape of a flat spring and made of, for example, stainless steel, flexure 223 that is attached to one end of load beam 222, and base plate 224 provided on the other end of load beam 222. Slider 210 is fixed to flexure 223 to provide slider 210 with an appropriate degree of freedom. The portion of flexure 223 to which slider 210 is attached has a gimbal section for maintaining slider 210 in a fixed orientation.

Slider 210 is arranged opposite to a hard disk, which is a rotationally-driven disc-shaped storage medium, in a hard disk drive. When the hard disk rotates in the z direction shown in FIG. 10, airflow which passes between the hard disk and slider 210 creates a dynamic lift, which is applied to slider 210 downward in the y direction. Slider 210 is configured to lift up from the surface of the hard disk due to this dynamic lift effect. Thin-film magnetic head 1 is formed in proximity to the trailing edge (the end portion at the lower left in FIG. 9) of slider 210, which is on the outlet side of the airflow.

The arrangement in which a head gimbal assembly 220 is attached to arm 230 is called a head arm assembly 221. Arm 230 moves slider 210 in transverse direction x with regard to the track of hard disk 262. One end of arm 230 is attached to base plate 224. Coil 231, which constitutes a part of a voice coil motor, is attached to the other end of arm 230. Bearing section 233 is provided in the intermediate portion of arm 230. Arm 230 is rotatably held by shaft 234 which is attached to bearing section 233. Arm 230 and the voice coil motor to drive arm 230 constitute an actuator.

Referring to FIG. 11 and FIG. 12, a head stack assembly and a hard disk drive that incorporate the slider mentioned above will be explained next. The arrangement in which head gimbal assemblies 220 are attached to the respective arm of a carriage having a plurality of arms is called a head stack assembly. FIG. 11 is a side view of a head stack assembly, and FIG. 12 is a plan view of a hard disk drive. Head stack assembly 250 has carriage 251 provided with a plurality of arms 252. Head gimbal assemblies 220 are attached to arms 252 such that head gimbal assemblies 220 are arranged apart from each other in the vertical direction. Coil 253, which constitutes a part of the voice coil motor, is attached to carriage 251 on the side opposite to arms 252. The voice coil motor has permanent magnets 263 which are arranged in positions that are opposite to each other and interpose coil 253 therebetween.

Referring to FIG. 12, head stack assembly 250 is installed in a hard disk drive. The hard disk drive has a plurality of hard disks which are connected to spindle motor 261. Two sliders 210 are provided per each hard disk 262 at positions which are opposite to each other and interpose hard disk 262 therebetween. Head stack assembly 250 and the actuator, except for sliders 210, work as a positioning device in the present invention. They carry sliders 210 and work to position sliders 210 relative to hard disks 262. Sliders 210 are moved by the actuator in the transverse direction with regard to the tracks of hard disks 262, and positioned relative to hard disks 262. Thin-film magnetic head 1 that is included in slider 210 writes information to hard disk 262 by means of the write head portion, and reads information recorded in hard disk 262 by means of the read head portion.

Although certain preferred embodiments of the present invention have been shown and described in detail, it should be understood that various changes and modifications may be made without departing from the spirit or scope of the appended claims.

The invention claimed is:

1. A thin film magnetic head comprising:
    a spin valve having a pinned layer whose magnetization direction is fixed relative to an external magnetic field, a first nonmagnetic intermediate layer which is disposed on said pinned layer, and a free layer whose magnetization direction is changed according to the external magnetic field, said free layer being disposed on said first nonmagnetic intermediate layer; and
    bias magnetic layers for applying a bias magnetic field to said free layer, said bias magnetic layers being provided on both sides of said spin valve with regard to a track width direction thereof,
    wherein said pinned layer comprises a hard magnetic layer, a second nonmagnetic intermediate layer which is disposed on said hard magnetic layer, and a ferromagnetic layer which is disposed on said second nonmagnetic intermediate layer, wherein said bias magnetic layer comprises a bias antiferromagnetic layer, and a bias ferromagnetic layer which is disposed on said bias antiferromagnetic layer, and wherein said pinned layer is formed in a manner such that a height direction dimension thereof is longer than a track width direction dimension thereof, and is longer than a height direction dimension of said free layer.

2. The thin film magnetic head according to claim 1, wherein said bias ferromagnetic layer is formed such that a track width direction dimension thereof is longer than a height direction dimension thereof.

3. The thin film magnetic head according to claim 2, wherein a ratio of said track width direction dimension of said bias ferromagnetic layer to said height direction dimension of said bias ferromagnetic layer is 10 or more.

4. The thin film magnetic head according to claim 1, wherein said hard magnetic layer is made of any one of CoPt, CoCrPt, and CoCrTa.

5. The thin film magnetic head according to claim 1, wherein said bias antiferromagnetic layer is made of IrMn.

6. The thin film magnetic head according to claim 1, wherein a ratio of said height direction dimension of said pinned layer to said track width direction dimension of said pinned layer is 5 or more.

7. The thin film magnetic head according to claim 1, wherein said bias ferromagnetic layers are provided on both sides of said free layer, said bias ferromagnetic layers being disposed at an elevation of said free layer measured in a thickness direction.

8. The thin film magnetic head according to claim 1, wherein said pinned layer is disposed on a buffer layer in contact with said buffer layer.

9. The thin film magnetic head according to claim 1, wherein said nonmagnetic intermediate layer is electrically conductive to allow sense current to flow in a direction that is perpendicular to film surfaces of said spin valve.

10. A slider comprising said thin film magnetic head according to claim 1.

11. A head gimbal assembly comprising:
said slider according to claim 10; and
a suspension for resiliently supporting said slider.

12. A hard disk drive comprising:
said slider according to claim 10, and
a device for supporting said slider and for positioning said slider with respect to a recording medium.

13. A wafer on which a stacked structure of layers is formed, wherein said stacked structure of layers form said thin film magnetic head according to claim 1.

14. A method for manufacturing a thin film magnetic head according to claim 1, comprising:

a step of forming a stacked structure of layers comprising the hard magnetic layer which is to be formed into the pinned layer whose magnetization direction is fixed relative to the external magnetic field, the first nonmagnetic intermediate layer, and the ferromagnetic layer which is to be formed into the free layer whose magnetization direction is changed according to the external magnetic field, wherein said hard magnetic layer, said first nonmagnetic intermediate layer, and said ferromagnetic layer are stacked in this order;

a first milling step of milling said stacked structure into a first rectangular shape;

a step of sequentially stacking the bias antiferromagnetic layers and the bias ferromagnetic layers on both sides of said stacked structure with regard to a longitudinal axis of said first rectangular shape, said stacked structure having been milled;

a second milling step of milling each bias ferromagnetic layer and said stacked structure which was milled, wherein said second milling step is performed in a manner such that said bias ferromagnetic layer is formed into a second rectangular shape, a longitudinal axis of said second rectangular shape corresponding to an short axis of said first rectangular shape, and such that said ferromagnetic layer is removed except for a portion that is sandwiched between said second rectangular shapes, and such that said hard magnetic layer survives;

an annealing step of annealing said bias antiferromagnetic layer in order to fix a magnetization direction of said bias antiferromagnetic layer in a direction of said longitudinal axis of said second rectangular shape; and a step of magnetizing said hard magnetic layer in order to fix a magnetization direction of said hard magnetic layer in a direction of a longitudinal axis of said first rectangular shape, wherein said step of magnetizing said hard magnetic layer is performed after said annealing step.

15. The method for manufacturing the thin film magnetic head according to claim 14, wherein said first milling step includes milling said stacked structure in a manner such that a dimension of said hard magnetic layer in a direction of said longitudinal axis of said first rectangular shape is 5 times or more larger than a dimension of said first rectangular shape in a direction of said short axis.

16. The method for manufacturing the thin film magnetic head according to claim 14, wherein said second milling step includes milling said bias ferromagnetic layers in a manner such that a dimension of said second rectangular shape in a direction of said longitudinal axis is 10 times or more larger than a dimension of said second rectangular shape in a direction of a short axis.

* * * * *